United States Patent
Taylor et al.

(10) Patent No.: US 10,533,501 B2
(45) Date of Patent: Jan. 14, 2020

(54) ENGINE BLEED AIR WITH COMPRESSOR SURGE MANAGEMENT

(71) Applicant: United Technologies Corporation, Farmington, CT (US)

(72) Inventors: Stephen H. Taylor, East Hartford, CT (US); Charles E. Lents, Amston, CT (US); Gabriel L. Suciu, Glastonbury, CT (US); Brian D. Merry, Andover, CT (US); Jesse M. Chandler, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 549 days.

(21) Appl. No.: 15/186,722

(22) Filed: Jun. 20, 2016

(65) Prior Publication Data

US 2017/0363014 A1    Dec. 21, 2017

(51) Int. Cl.
*F02C 9/24* (2006.01)
*F02C 3/13* (2006.01)
*F02C 6/08* (2006.01)
*F02C 9/18* (2006.01)
*F02K 3/06* (2006.01)

(52) U.S. Cl.
CPC ............... *F02C 9/24* (2013.01); *F02C 3/13* (2013.01); *F02C 6/08* (2013.01); *F02C 9/18* (2013.01); *F02K 3/06* (2013.01)

(58) Field of Classification Search
CPC ...... F02C 9/16; F02C 9/18; F02C 9/24; F02C 3/13; F02C 7/185; F02C 7/32; F01D 25/12
See application file for complete search history.

(56) References Cited

U.S. PATENT DOCUMENTS

| | | | |
|---|---|---|---|
| 5,036,678 A * | 8/1991 | Renninger | B64D 13/06 62/402 |
| 5,137,230 A | 8/1992 | Coffinberry | |
| 5,452,573 A * | 9/1995 | Glickstein | F02C 6/08 60/39.183 |
| 5,992,139 A * | 11/1999 | Kesseli | F02C 6/12 60/39.183 |
| 7,049,019 B2 | 5/2006 | Tsunoda | |
| 8,063,501 B2 * | 11/2011 | Finney | F01D 15/10 290/52 |
| 8,904,805 B2 | 12/2014 | Hipsky et al. | |
| 8,955,794 B2 | 2/2015 | Mackin et al. | |

(Continued)

OTHER PUBLICATIONS

European Search Report for EP Application No. 17176981.3 dated Nov. 10, 2017.

*Primary Examiner* — Craig Kim
(74) *Attorney, Agent, or Firm* — Carlson, Gaskey & Olds, P.C.

(57) ABSTRACT

A gas turbine engine includes a main compressor section. A booster compressor includes an inlet and an outlet. The inlet receives airflow from the main compressor section and the outlet provides airflow to a pneumatic system. A recirculation passage is between the inlet and the outlet. A flow splitter valve controls airflow between the outlet and the inlet through the recirculation passage for controlling airflow to the pneumatic system based on airflow output from the booster compressor. A bleed air system for a gas turbine engine and a method of controlling engine bleed airflow are also disclosed.

15 Claims, 3 Drawing Sheets

(56) References Cited

U.S. PATENT DOCUMENTS

| | | |
|---|---|---|
| 8,967,528 B2 | 3/2015 | Mackin et al. |
| 9,062,604 B2 | 6/2015 | DeFrancesco |
| 9,163,562 B2 | 10/2015 | Suciu et al. |
| 2010/0107594 A1 | 5/2010 | Coffinberry et al. |
| 2012/0180509 A1 | 7/2012 | DeFrancesco |
| 2013/0040545 A1 | 2/2013 | Finney |
| 2013/0086922 A1 | 4/2013 | Suciu et al. |
| 2014/0165588 A1 | 6/2014 | Snape et al. |
| 2014/0196469 A1 | 7/2014 | Finney et al. |
| 2014/0352315 A1 | 12/2014 | Diaz |
| 2015/0065023 A1 | 3/2015 | Bruno |
| 2015/0121842 A1 | 5/2015 | Moes |
| 2015/0275758 A1 | 10/2015 | Foutch et al. |

\* cited by examiner

ENGINE BLEED AIR WITH COMPRESSOR SURGE MANAGEMENT

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section.

Pneumatic systems of the aircraft utilize engine bleed air for pneumatic power. The engine bleed air is obtained from locations within the compressor section to provide air at pressures required by the pneumatic system. Pressures within the compressor section vary during engine operating cycle. At lower engine power settings pressures within the compressor section may closely match demand of the pneumatic systems, however at higher engine power settings pressures at the same compressor location may greatly exceed demand. For this reason, engine bleed air is typically obtained from different locations within the compressor section depending on the current engine operating conditions in an effort to improve engine efficiency. Even tapping air from many different locations, variation of air pressures during engine operation can create difficulties in matching the demand of the pneumatic system. Differences between airflow and pressure demands of the pneumatic system and available air pressures from the engine can reduce engine operating efficiency.

SUMMARY

In a featured embodiment, a gas turbine engine includes a main compressor section. A booster compressor includes an inlet and an outlet. The inlet receives airflow from the main compressor section and the outlet provides airflow to a pneumatic system. A recirculation passage is between the inlet and the outlet. A flow splitter valve controls airflow between the outlet and the inlet through the recirculation passage for controlling airflow to the pneumatic system based on airflow output from the booster compressor.

In another embodiment according to the previous embodiment, includes a heat exchanger for cooling airflow through the recirculation passage prior to the inlet of the booster compressor.

In another embodiment according to any of the previous embodiments, the main compressor section includes a low pressure compressor section suppling airflow through a first passage to the booster compressor inlet and a high pressure compressor section supplying airflow through a second passage directly to the pneumatic system separate from the booster compressor.

In another embodiment according to any of the previous embodiments, the second passage may extend through the heat exchanger separate from airflow through the recirculation passage for cooling airflow supplied directly to the pneumatic system from the high pressure compressor section.

In another embodiment according to any of the previous embodiments, includes a first control valve controlling airflow from the high pressure compressor to the second passage.

In another embodiment according to any of the previous embodiments, includes a second control valve controlling airflow from the recirculation passage into the first passage.

In another embodiment according to any of the previous embodiments, includes a turbine coupled to the booster compressor for driving the booster compressor. The turbine is driven by airflow through a turbine inlet from the main compressor section.

In another embodiment according to any of the previous embodiments, includes a mixing valve combining airflow from the booster compressor and the turbine for communication to the pneumatic system.

In another featured embodiment, a bleed air system for a gas turbine engine includes a booster compressor including an inlet and an outlet. The inlet receives airflow from a main compressor section of the gas turbine engine and the outlet providing airflow to a pneumatic system. A recirculation passage is between the inlet and the outlet. A recirculation valve controls airflow between the outlet and the inlet through the recirculation passage for controlling airflow to the pneumatic system.

In another embodiment according to the previous embodiment, includes a heat exchanger for cooling airflow through the recirculation passage prior to the inlet of the booster compressor.

In another embodiment according to any of the previous embodiments, includes a first passage to the booster compressor inlet from a low pressure section of the main compressor and second passage bypassing the booster compressor for supplying airflow from a high pressure section of the main compressor directly to the pneumatic system.

In another embodiment according to any of the previous embodiments, the second passage extends through the heat exchanger separate from airflow through the recirculation passage for cooling airflow supplied directly to the pneumatic system from the high pressure section.

In another embodiment according to any of the previous embodiments, includes a turbine coupled to drive the booster compressor. The turbine is driven by airflow from the main compressor section.

In another embodiment according to any of the previous embodiments, includes an electric motor or an accessory gearbox driven through a mechanical coupling to an engine shaft used to drive the booster compressor.

In another featured embodiment, a method of controlling engine bleed airflow includes configuring a booster compressor to receive engine bleed air from a main compressor section of gas turbine engine through an inlet. The engine bleed air is compressed from the main compressor with the booster compressor and supplying the compressed engine bleed air to an outlet passage. Airflow is controlled from the outlet passage to a pneumatic system with a recirculation path by directing airflow between from the outlet passage to the pneumatic system and a recirculation passage. Airflow through the recirculation passage is supplied to the inlet of the booster compressor.

In another embodiment according to the previous embodiment, includes cooling airflow in the recirculation passage with a heat exchanger.

In another embodiment according to any of the previous embodiments, includes supplying airflow from the main compressor directly to the pneumatic system and bypassing the booster compressor responsive to airflow from the main compressor being within a desired pressure and temperature range.

In another embodiment according to any of the previous embodiments, includes routing airflow from the main compressor through the heat exchanger, separate from airflow through the recirculation passage prior to the pneumatic system.

In another embodiment according to any of the previous embodiments, includes driving a turbine coupled to the booster compressor with airflow from the main compressor and mixing airflow exhausted from the turbine with airflow from the outlet of the booster compressor.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
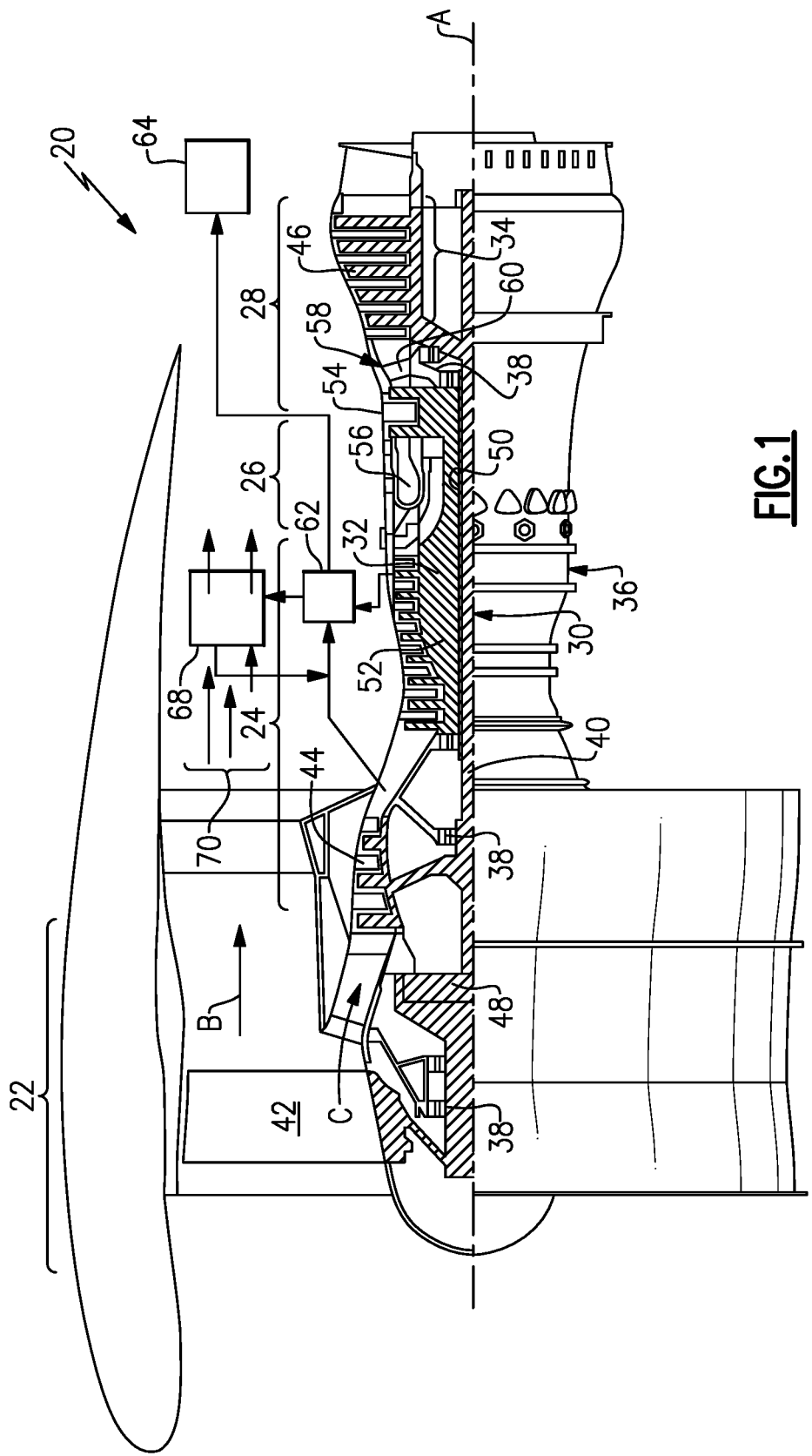
FIG. 1 schematically shows an example gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high-energy exhaust gas stream that expands through the turbine section 28 where energy is extracted and utilized to drive the fan section 22 and the compressor section 24.

Although the disclosed non-limiting embodiment depicts a two-spool turbofan gas turbine engine, it should be understood that the concepts described herein are not limited to use with two-spool turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram °R)/(518.7° R)]^{0.5}$. The "Low corrected fan tip speed", as disclosed herein according to one non-limiting embodiment, is less than about 1150 ft/second. The example fan pressure ratio and fan tip speed are determined at least at conditions corresponding with engine operating conditions during take-off.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Gas turbine engines designs are seeking to increase overall efficiency by generating higher overall pressure ratios. By achieving higher overall pressure ratios, increased levels of performance and efficiency may be achieved. However, challenges are raised in that the parts and components associated with a high pressure turbine require additional cooling air as the overall pressure ratio increases.

The example engine 20 includes an engine bleed air system 62 that supplies engine bleed air to pneumatic systems schematically illustrated at 64. The pneumatic system 64 can include an environmental control system as well as systems utilize airflow. The pneumatic system 64 utilizes air within a defined range of pressures and temperatures to operate auxiliary systems and cooling systems of the engine and aboard the aircraft. The airflow required to operate the pneumatic system 64 is drawn from the engine 20. Specifically, airflow for the pneumatic system 64 is drawn from the compressor section 24 of the main engine 20.

Instead of attempting to match pneumatic system demand with airflow and pressures at a specific location within the compressor section 24, the example engine bleed air system 62 increases air pressure from lower pressure locations in the engine 20 to pressures required for operation of the pneumatic system 64. During engine operation, airflow is supplied to the engine bleed air system 62 and then passed to the pneumatic system 64.

Airflow from the main compressor section 24 varies in pressure and temperature depending on the current engine operating condition. In some instances, bleed air may be drawn from the compressor section 24 and is suitable for use in the pneumatic system 64 without conditioning. In other circumstances, the airflow provided by the main compressor section 24 is well above the pressures and temperatures required by the pneumatic system 64. Accordingly, the example bleed air system 62 draws air from a position in the main compressor section 24 determined to always be below the pressures required by the pneumatic system 64. The engine bleed air system 62 increases the pressures of the airflow to that required by the pneumatic system 64.

Airflow supplied from the main compressor section 24 will vary depending on current engine operation. Accordingly, the varying input airflow and pressures can result in a varying output of airflow and pressures beyond what is required by the pneumatic system 64. The variation in incoming airflow and pressure is accommodated by the disclosed engine bleed air system 62 to provide airflows and pressures within acceptable ranges while enabling operation within a stable operating range.

Figure 2:
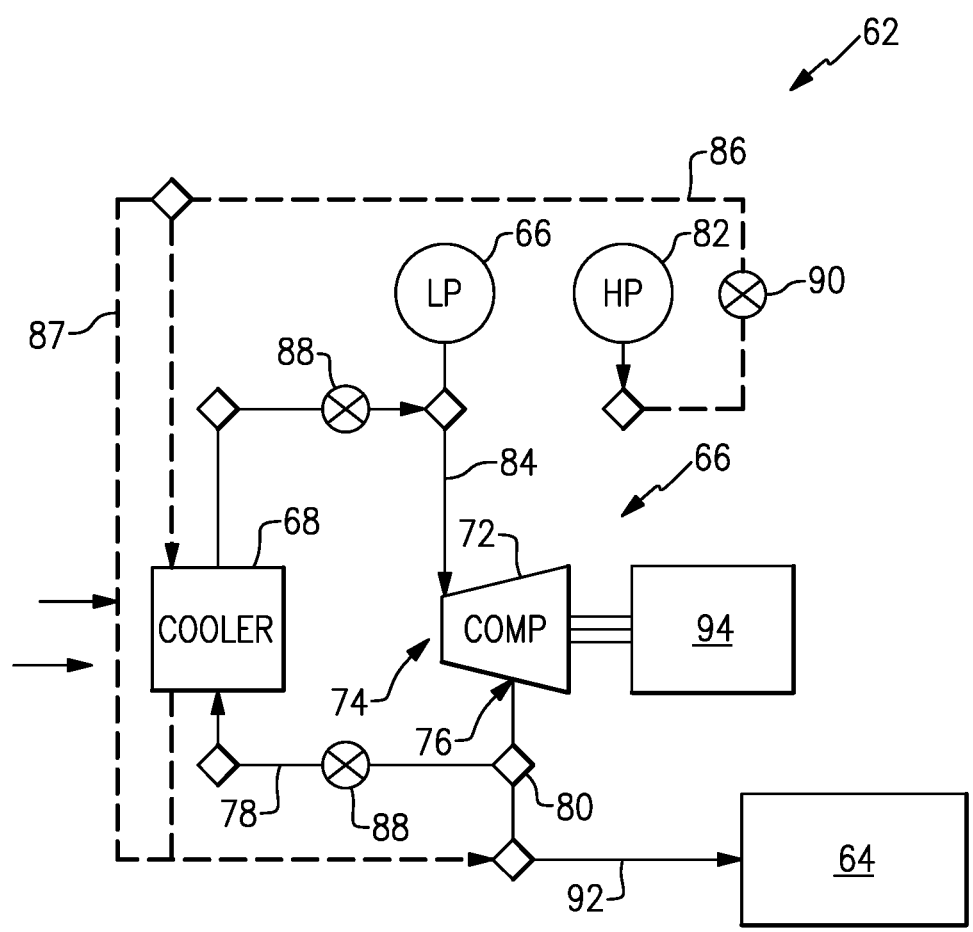
FIG. 2 schematically shows an example engine bleed system embodiment.

Referring to FIG. 2 with continued reference to FIG. 1, the example engine bleed air system 62 includes a booster compressor 72. The booster compressor 72 includes an inlet 74 and an outlet 76 and is driven by a shaft coupled to a drive 94. The drive 94 may include an electric motor or an accessory gearbox driven through a mechanical coupling to an engine shaft, or a turbine powered by bleed air from the high pressure port 82. Airflow to the inlet 74 is communicated through a first passage 84 from a low pressure source 66 of the main compressor section 24. In this example the low pressure source 66 is located within the low pressure compressor 44. Moreover, the low pressure source 66 could also utilize bypass airflow or airflow from other locations where airflow is at pressures lower than required by the pneumatic system 64.

During operation, the compressor 72 increases pressure supplied by the low pressure source 66 and supplies the increased pressure airflow through an outlet passage 92 to the pneumatic system 64. For certain engine operating conditions, the airflow demand of the pneumatic system 64 results result in airflow from the low pressure source 66 that is too low to maintain compressor operation within a stable range without changing mechanical characteristics of the compressor 72. Accordingly, the example engine bleed air system 62 enables the compressor 72 to operate within a stable range by exhausting a portion of excess airflow through a recirculation passage 78. Instead of attempting to match flow rate output from the compressor 72 to the demand of the pneumatic system 64, a portion of the output airflow is recirculated back to the compressor inlet 74. Recirculation of a portion of the output airflow enables the compressor 72 to operate within a stable operating flow rate and/or speed even if such operation results in excess airflow and pressure beyond that demanded by the pneumatic system 64. A pressure reduction valve 88 is provided within the recirculation passage 78 to reduce the pressure of the flow such that it may be mixed with fresh flow from the low pressure source 66. A flow splitter valve 80, is used to control the flow between the outlet passage 92, and the recirculation passage 78. The recirculation passage 78 recirculates air back to the inlet 74 of the compressor 72. Prior to being communicated back to the inlet 74, airflow is routed through a heat exchanger 68, then the pressure reduction valve 88, and finally back into the first passage 84 where it is mixed with airflow from the low pressure source 66.

The heat exchanger 68 is preferably disposed within the engine bypass flow path B of FIG. 1 such that bypass airflow 70 is utilized to cool airflow through the recirculation passage 78. Alternatively air could be drawn out of the bypass flow fan duct (with a scoop) into the heat exchanger and reintroduced back into the fan duct. The pressure reduction valve 88 is provided within the recirculation passage 78 proximate to the first passage 84 to reduce the pressure of the airflow through the recirculation path back to the pressure of the inlet 74 of the compressor 72.

In some operating conditions, airflow from a high pressure source 82 is at the desired temperature and pressure required for use by the pneumatic system 64. Examples of operating conditions where airflow from the high pressure source 82 might match demand of the pneumatic system 64 include idling on a runway or idling during an aircraft descent.

Accordingly, airflow from the high pressure source 82 can be communicated through a second passage 86 directly to the pneumatic system 64 bypassing the engine bleed air system 62. In this example, a second control valve 90 is disposed within the second passage 86 to control airflow that bypasses the engine bleed air system 62. Airflow through the second passage 86 may be required to be cooled and therefore may be routed through the heat exchanger 68 separately from the recirculation passage 78. Moreover, airflow may be not require cooling and is bypassed through a passage 87 around the heat exchanger 68. Accordingly, airflow can be directed and bypassed around the engine bleed air system 62 and provided directly to the pneumatic system 64 during limited operating conditions where the pressure of the airflow from the main engine compressor section 24 matches the demand pressure. In most engine operating conditions, airflows and pressures from the high pressure source 82 greatly exceed demand.

Efficient and/or stable operation of the compressor 72 may require air flow rates larger than the flow rate of the demand of the pneumatic system 64 for some operating conditions. In these conditions, the flow needs of the compressor are accommodated by allowing a flow rate through the compressor which exceeds demand, and then redirecting the excess portion of air through the recirculation passage 78. The redirected airflow is then utilized and communicated back to the compressor inlet 74 for use by the compressor 72.

Figure 3:
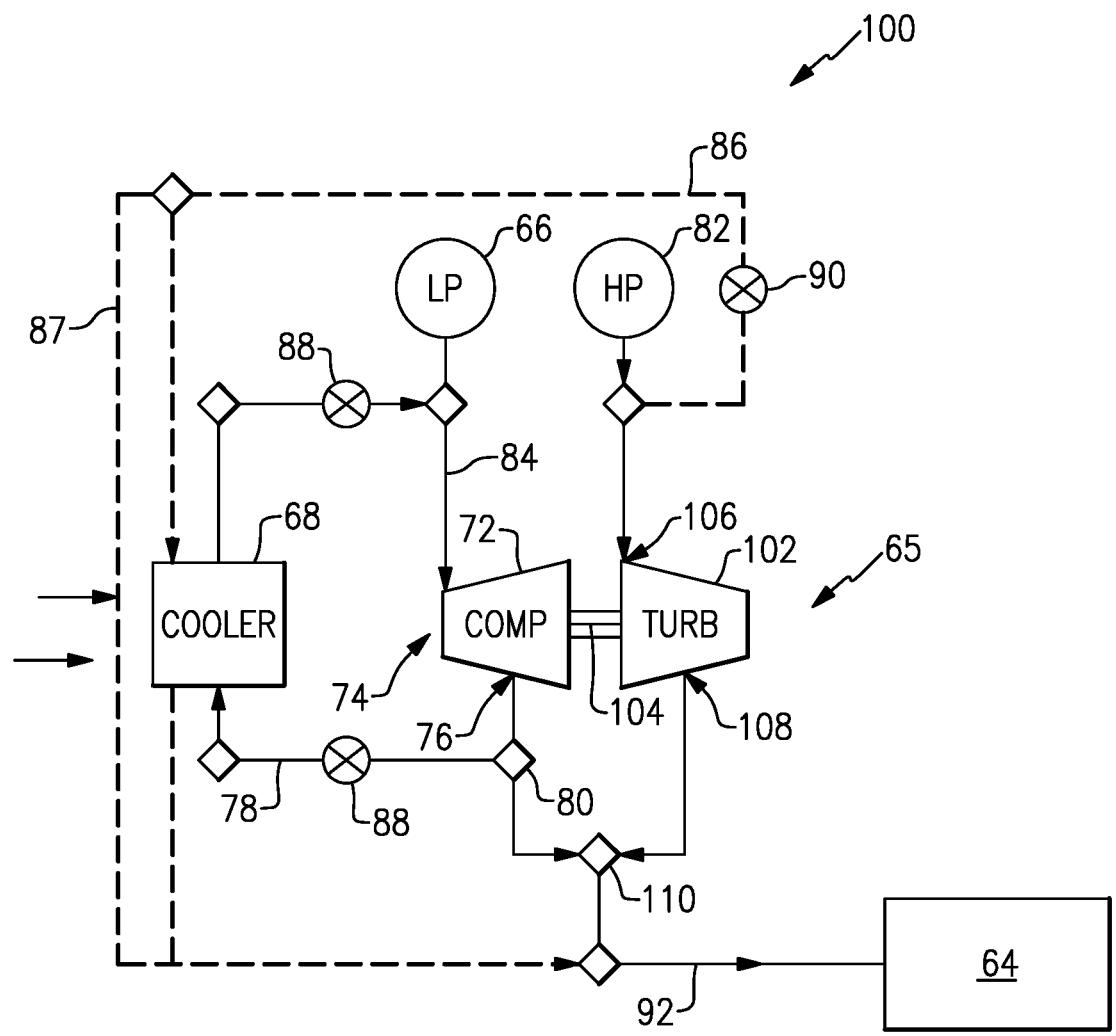
FIG. 3 schematically illustrates another example engine bleed air system embodiment.

Referring to FIG. 3 with continued reference to FIG. 1, another example engine bleed air system embodiment is shown at 110 and includes a turbo-compressor 65. The turbo-compressor 65 includes the compressor 72 that is driven by a turbine 102 coupled to the compressor 72 through a shaft 104. The turbine 102 includes an inlet 106 that receives airflow from the high pressure source 82 and is driven by expansion of high pressure air through the turbine 102. Airflow from the high pressure source 82 is at a temperature and pressure much higher than that communicated from a low pressure source 85. Airflow exhausted through a turbine outlet 108 is communicated to a mixing junction 110 along with airflow from the compressor outlet 76. The mixing junction 110 may include a valve or a simply a conduit connection that mixes the two outlet airflows.

During operation, engine bleed air is communicated from the low pressure source 85 to the compressor inlet 74. If the airflow communicated to the compressor inlet 74 is within a desired temperature and range, the compressor 72 increases the pressure and airflow to match the demand of the pneumatic system 64. In such instances, the recirculation valve 80 remains in a closed position such that mixed airflow from the outlet 76 of the compressor 72 and from the turbine 102 is communicated to the pneumatic system 64.

In other engine operating conditions, the airflow required through the compressor 72 such that the flow rate demand of the pneumatic system 64 would be exactly met by the mixed flow 92 is such that the compressor 72 would not operate within a stable flow rate and/or speed. Most commonly, if the incoming airflow is at a pressure that is sufficiently or substantially at the required demand pressures and the required flow rate is relatively small, then the compressor 72 would be required to operate at conditions that substantially reduce efficiency or are infeasible.

In such an instance, the example engine bleed air system 100 opens the flow splitter valve 80 such that a portion of the outlet airflow is directed through the recirculation passage 78. Opening of the flow splitter valve 80 enables operation of the compressor 72 at flow rates in excess of the demand of the pneumatic system 64. The excess airflow is directed through the recirculation passage 78 and communicated back to the compressor inlet 74. (In final figure, 74 should point to top left corner of compressor, not center left point) The remaining portion of the airflow is provided at demand pressure and flow to the pneumatic system 64.

Accordingly, by splitting a portion of flow exhausted from the compressor 72 into a recirculation passage 78, the example compressor 72 can operate at increased flows that provide stable and efficient operation.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A gas turbine engine comprising:
a main compressor section including a low pressure compressor section and a high pressure compressor section;
a booster compressor including an inlet and an outlet, the inlet receiving airflow from the low compressor section and the outlet providing airflow to a pneumatic system;
a recirculation passage communicating airflow from the booster compressor outlet to a passage in communication with the inlet receiving airflow from the low pressure compressor section, wherein a pressure reduction valve is disposed within the recirculation passage for reducing a pressure of airflow to enable mixing with the airflow from the low compressor section; and
a flow splitter valve controlling airflow from the booster compressor outlet to the recirculation passage and the pneumatic system based on airflow output from the booster compressor, wherein the pressure reduction valve is downstream of the flow splitter valve and the low pressure compressor section supplies airflow through a first passage to the booster compressor inlet and the high pressure compressor section supplies airflow through a second passage directly to the pneumatic system separate from the booster compressor.

2. The gas turbine engine as recited in claim 1, including a heat exchanger for cooling airflow through the recirculation passage prior to the inlet of the booster compressor.

3. The gas turbine engine as recited in claim 2, wherein the second passage may extend through the heat exchanger separate from airflow through the recirculation passage for cooling airflow supplied directly to the pneumatic system from the high pressure compressor section.

4. The gas turbine engine as recited in claim 2, including a first control valve controlling airflow from the high pressure compressor to the second passage.

5. The gas turbine engine as recited in claim 2, including a turbine coupled to the booster compressor for driving the booster compressor, the turbine driven by airflow through a turbine inlet from the main compressor section.

6. The gas turbine engine as recited in claim 5, including a mixing valve combining airflow from the booster compressor and the turbine for communication to the pneumatic system.

7. A bleed air system for a gas turbine engine, the bleed air system comprising:
- a booster compressor including an inlet and an outlet, the inlet receiving airflow from a main compressor section of the gas turbine engine and the outlet providing airflow to a pneumatic system;
- a first passage to the booster compressor inlet from a low pressure section of the main compressor; and
- a second passage bypassing the booster compressor for supplying airflow from a high pressure section of the main compressor directly to the pneumatic system;
- a recirculation passage between the inlet from the low pressure section of the main compressor and the outlet of the booster compressor;
- a pressure reduction valve disposed within the recirculation passages for reducing a pressure of airflow to enable mixing of airflow from the low pressure section of the main compressor within the inlet; and
- a flow splitter valve controlling airflow from the booster compressor outlet to the recirculation passages and the pneumatic system based on airflow output from the booster compressor, wherein the pressure reduction valve is downstream of the flow splitter valve.

8. The bleed air system as recited in claim 7, including a heat exchanger for cooling airflow through the recirculation passage prior to the inlet of the booster compressor.

9. The bleed air system as recited in claim 8, wherein the second passage extends through the heat exchanger separate from airflow through the recirculation passage for cooling airflow supplied directly to the pneumatic system from the high pressure section.

10. The bleed air system as recited in claim 8, including a turbine coupled to drive the booster compressor, the turbine driven by airflow from the main compressor section.

11. The bleed air system as recited in claim 8, including an electric motor or an accessory gearbox driven through a mechanical coupling to an engine shaft used to drive the booster compressor.

12. A method of controlling engine bleed airflow comprising:
- configuring a booster compressor to receive engine bleed air from a low pressure compressor section of gas turbine engine through an inlet;
- compressing the engine bleed air from the low pressure section with the booster compressor and supplying the compressed engine bleed air to an outlet passage;
- controlling airflow from the outlet passage between a pneumatic system with a recirculation path with a flow splitter valve for directing airflow between from the outlet passage to the pneumatic system and the recirculation passage, wherein a pressure reduction valve is disposed within the recirculation passages for reducing airflow through the recirculation passage to enable mixing with airflow from the low pressure compressor section supplied to the inlet of the booster compressor; and
- supplying airflow from the main compressor directly to the pneumatic system and bypassing the booster compressor responsive to airflow from the main compressor being within a predefined temperature range.

13. The method as recited in claim 12, including cooling airflow in the recirculation passage with a heat exchanger.

14. The method as recited in claim 13, including routing airflow from the main compressor through the heat exchanger, separate from airflow through the recirculation passage prior to the pneumatic system.

15. The method as recited in claim 13, including driving a turbine coupled to the booster compressor with airflow from the main compressor and mixing airflow exhausted from the turbine with airflow from the outlet of the booster compressor.

* * * * *